US012674758B2

(12) United States Patent
Hocke et al.

(10) Patent No.: US 12,674,758 B2
(45) Date of Patent: Jul. 7, 2026

(54) METHOD AND DEVICE FOR DETECTING AT LEAST ONE FLUORESCENCE PATTERN ON AN IMMUNOFLUORESCENCE IMAGE OF A BIOLOGICAL CELL SUBSTRATE

(71) Applicant: EUROIMMUN Medizinische Labordiagnostika AG, Lübeck (DE)

(72) Inventors: Jens Hocke, Lübeck (DE); Jens Krauth, Lübeck (DE); Stefan Gerlach, Lübeck (DE); Christopher Krause, Lübeck (DE); Melanie Hahn, Lübeck (DE); Jörn Voigt, Lübeck (DE); Enno Schmidt, Lübeck (DE); Nina Van Beek, Lübeck (DE)

(73) Assignee: EUROIMMUN Medizinische Labordiagnostika AG, Lübeck (DE)

( * ) Notice: Subject to any disclaimer, the term of this patent is extended or adjusted under 35 U.S.C. 154(b) by 109 days.

(21) Appl. No.: 18/375,321

(22) Filed: Sep. 29, 2023

(65) Prior Publication Data

US 2024/0118209 A1 Apr. 11, 2024

(30) Foreign Application Priority Data

Sep. 30, 2022 (EP) ..................................... 22199236

(51) Int. Cl.
*G06V 10/82* (2022.01)
*G01N 21/64* (2006.01)
(Continued)

(52) U.S. Cl.
CPC ..... *G01N 21/6456* (2013.01); *G01N 21/6486* (2013.01); *G06T 7/0012* (2013.01); (Continued)

(58) Field of Classification Search
CPC ........... G01N 21/6456; G01N 21/6486; G01N 2469/10; G01N 33/582; G01N 21/6428; (Continued)

(56) References Cited

U.S. PATENT DOCUMENTS 11,367,187 B2    6/2022    Krauth et al.
11,549,889 B2    1/2023    Gerlach et al.
(Continued)

FOREIGN PATENT DOCUMENTS

CN        112240878 A      1/2021
EP          3767587 A1      1/2021
(Continued)

OTHER PUBLICATIONS

Guan-Ting Jiang, Yi-Da Wu, Tsu-Yi Hsieh, Yu-Leh Huang, Automatic HEp-2 Cell Segmentation in Indirect Immunofluorescence Images Using Deep Learning, International Forum on Medical Imaging, 2021, 6 pages, vol. 11792 1179205-1, Proc. of SPIE, Asia.
(Continued)

*Primary Examiner* — Uzma Alam
*Assistant Examiner* — Mamadou Faye
(74) *Attorney, Agent, or Firm* — Taylor Dykema PLLC; Eric Kleinertz

(57) ABSTRACT

A method is proposed for detecting at least one fluorescence pattern on an immunofluorescence image of a biological cell substrate, comprising the following steps: incubating the cell substrate with a liquid patient sample, which potentially includes primary antibodies, and furthermore with secondary antibodies, which are marked using a fluorescence stain, irradiating the cell substrate using excitation radiation and capturing the immunofluorescence image, determining segmentation information comprising at least one first and one second segmentation area, wherein the segmentation areas each represent a respective cell substrate area, via segmen-
(Continued)

tation of the immunofluorescence image using a first neural network, determining a boundary area, which represents a transition from the first cell substrate area towards the second cell substrate area in the fluorescence image, on the basis of the segmentation information, selecting multiple partial images from the immunofluorescence image along the boundary area, determining a confidence measure of a presence of the fluorescence pattern on the basis of the multiple partial images via a second neural network.

11 Claims, 10 Drawing Sheets

(51) Int. Cl.
      G06T 7/00          (2017.01)
      G06T 7/136         (2017.01)
(52) U.S. Cl.
      CPC .......... G06T 7/136 (2017.01); G01N 2469/10 (2013.01); G06T 2207/20084 (2013.01)
(58) Field of Classification Search
      CPC ................... G06T 7/0012; G06T 7/136; G06T 2207/20084; G06V 10/82; G06V 20/698; G06V 20/695
      See application file for complete search history.

(56)                References Cited

U.S. PATENT DOCUMENTS

| | | |
|---|---|---|
| 2019/0371425 A1 | 12/2019 | Kuo et al. |
| 2020/0011862 A1 | 1/2020 | Morgenroth et al. |
| 2021/0245152 A1 | 8/2021 | Morgenroth et al. |
| 2021/0383091 A1 * | 12/2021 | Bredno ................. G16H 10/40 |
| 2022/0082567 A1 | 3/2022 | Gerlach et al. |
| 2022/0196553 A1 | 6/2022 | Krauth et al. |
| 2022/0228989 A1 | 7/2022 | Krause et al. |
| 2023/0071078 A1 | 3/2023 | Gerlach et al. |
| 2023/0186659 A1 * | 6/2023 | Martin ................. G06N 3/0464 |
| | | 382/133 |

FOREIGN PATENT DOCUMENTS

| | | | |
|---|---|---|---|
| EP | 4016082 A1 | 6/2022 | |
| WO | WO-2015055240 A1 * | 4/2015 | ............. A61P 37/02 |
| WO | 2022036086 A1 | 2/2022 | |

OTHER PUBLICATIONS

China National Intellectual Property Administration, Notification of the First Office Action in related Chinese Patent App. No. 202311188732.3, dated Nov. 29, 2025, 6 pages.

* cited by examiner

SEG
SB1
SB2
SB2
SB4

| EPa classifier (EPa Classifier) | | Visual (EUROPattern) | | | | | | | | | |
|---|---|---|---|---|---|---|---|---|---|---|---|
| | | combined | | | 'epidermal' | | | 'dermal' | | | |
| | | positive | negative | total | present | not present | total | present | not present | total | |
| | positive | 31 | 4 | 35 | 25 | 3 | 28 | 8 | 3 | 11 | |
| | negative | 1 | 73 | 74 | 1 | 80 | 81 | 0 | 98 | 98 | |
| | total | 32 | 77 | 109 | 26 | 83 | 109 | 8 | 101 | 109 | |
| | | accuracy: | | 95.4% | accuracy: | | 96.3% | accuracy: | | 97.3% | |
| | | PPA: | | 96.9% | PPA: | | 96.2% | PPA: | | 100.0% | |
| | | NPA: | | 94.8% | NPA: | | 96.4% | NPA: | | 97.0% | |

METHOD AND DEVICE FOR DETECTING AT LEAST ONE FLUORESCENCE PATTERN ON AN IMMUNOFLUORESCENCE IMAGE OF A BIOLOGICAL CELL SUBSTRATE

The invention relates to a method for detecting at least one fluorescence pattern on an immunofluorescence image of a biological cell substrate.

For the purpose of obtaining information for a diagnostic question, biological substrates, such as a cell substrate, can be processed via so-called immunofluorescence and the immunofluorescence images resulting of the substrate can then be analysed.

Indirect immunofluorescence microscopy is an in vitro test for detecting circulating human antibodies against specific antigens, in order to be able to answer or assess a diagnostic question. Such antigens are, for example, present in specific areas of cell substrates, in particular skin layers of primates. A cell substrate which is incubated using a patient sample in the form of blood or diluted blood or blood serum or diluted blood serum is thus used as the substrate. The patient sample thus potentially has specific antibodies, which can be the expression of a presence of a disease of the patient. Such primary or specific antibodies can then bind antigens of the substrate. Such bound primary antibodies can then be marked in that in a further incubation step, so-called secondary antibodies, preferably antihuman antibodies, bind to the bound primary antibodies and can later be made visible in that the secondary antibodies are marked using a fluorescence stain. Such a fluorescence stain is preferably a green fluorescence stain, in particular the fluorescence stain FITC. Such binding of a primary, antibody jointly with a fluorescence-marked secondary antibody can then be made visible later in that the substrate is irradiated using excitation light of a specific wavelength and the bound fluorescence stains are thus excited to emit fluorescence radiation.

A biological cell substrate can in this case in particular be a cell smear of cell lines, a colony of cell lines, and/or biological tissue having biological tissue cells, in particular from a tissue section.

The detected autoantibodies can be assigned to disease groups depending on the fluorescence pattern on the respective substrate. The object thus results of detecting one or more fluorescence pattern types in a fluorescence image of indirect immunofluorescence microscopy via digital image processing in the course of immunofluorescence microscopy in a cell substrate incubated in the described manner.

In particular in the observation of diseases such as bullous autoimmune dermatoses, which affect human skin, information can be obtained via immunofluorescence image analysis as to whether any bullous autoimmune dermatosis is present and preferably also a differentiation of which type or subgroup of bullous autoimmune dermatoses are present.

For this purpose, sometimes oesophagus sections of a monkey and/or so-called salt-split skin substrates are subjected to immunofluorescence as the biological cell substrate.

A so-called salt-split skin is a biological cell substrate in the form of a skin substrate of a primate, preferably a monkey. In such a skin substrate, a separation of the epidermis from the dermis is induced by injection of a saline solution, in particular 1 molar sodium chloride solution.

The object of the present invention is to analyse an immunofluorescence image of a biological cell substrate in an automated manner using at least one neural network as to whether at least one fluorescence pattern is present in the immunofluorescence image of the cell substrate.

The object according to the invention is achieved by the method according to the invention. According to the invention, initially the cell substrate is incubated with a liquid patient sample, which potentially includes primary antibodies, and furthermore with secondary antibodies which are marked using a fluorescent stain, wherein furthermore the cell substrate is irradiated using excitation radiation and then an immunofluorescence image of the cell substrate is captured. The capture of the immunofluorescence image takes place in particular in a green channel.

Furthermore, according to the invention segmentation information is determined which includes at least one first and one second segmentation area. The respective segmentation areas each represent a respective cell substrate area of the cell substrate. This segmentation information is determined via segmentation of the immunofluorescence image using a first neural network.

Furthermore, a determination of a boundary area follows, which represents a transition from the first cell substrate area towards the second cell substrate area in the fluorescence image, on the basis of the segmentation information. Furthermore, multiple partial images of the immunofluorescence image are selected along the determined boundary area. Furthermore, a confidence measure of a presence of the fluorescence pattern is determined on the basis of the multiple partial images via a second neural network.

Various aspects of this method according to the invention will now be described in more detail to represent possible advantages of the method according to the invention.

The fundamental question of analysing an immunofluorescence image with respect to a presence of a fluorescence pattern to be expected is sufficiently known in immunofluorescence. Since there are different fluorescence patterns to be expected depending on the diagnostic question, an image processing method for an immunofluorescence image is particularly high-performance when it is especially matched to the fluorescence patterns to be expected for an analysis using a neural network. Easy processing of a large, overall immunofluorescence image via a neural network, which takes into consideration all image information of the entire immunofluorescence image, requires a high-complexity neural network, which has to carry out a particularly large number of computing operations. Furthermore, such a neural network having a high complexity and many degrees of freedom is particularly difficult to train, since a large amount of training data is required to achieve a generalization of the neural network.

Therefore, the proposed method according to the invention explicitly deviates from such an approach of an overall analysis of an overall immunofluorescence image via a neural network, in order to be particularly high-performance.

An exemplary immunofluorescence image FB of a cell substrate, preferably in the form of a salt-split skin here, is shown in FIG. 1.

The immunofluorescence image FB shows a cell substrate area ED for the cell substrate, which presents an epidermis. Furthermore, the immunofluorescence image FB shows an area DE, which represents a dermis. In the salt-split skin, a so-called intermediate area or a so-called bubble is clearly recognizable as a substrate area BL. The first cell substrate area is thus preferably the epidermis, wherein the second cell substrate area is preferably the intermediate space or the bubble between dermis and epidermis.

FIG. 1 furthermore shows a so-called background area or background BG in the fluorescence image FB.

A transition or boundary area between the epidermis ED and the bubble EL is preferably also designated as the bubble roof BD. In the immunofluorescence image of FIG. 1, a fluorescence is present along this bubble roof BD as a boundary area.

Furthermore, a boundary area BE results as the so-called bubble floor, which is thus a boundary area between the bubble BL (or the intermediate space) and the dermis DE. In the example of the fluorescence image FE of FIG. 1, there is no fluorescence along the bubble floor.

If a fluorescence is present along at least one of the boundary areas, thus along only the bubble roof, only the bubble floor, or the bubble roof and the bubble floor, this is an indication of a principal pemphigoid disease. If a presence of a fluorescence pattern is thus detected according to the invention in a boundary area, this is thus an indication of a principal pemphigoid disease.

If a presence of a fluorescence pattern is preferably detected in a specific boundary area, which is preferably the bubble roof BD, information can thus be obtained for the question of possible diseases coming into question that certain groups of diseases can be excluded. Therefore, information as to whether a fluorescence is present along the boundary area or the bubble roof BD is an advantage for a clinician. When the previously determined boundary area between determined cell substrate areas, such as the epidermis ED and the intermediate space or the bubble EL, is analysed and a presence of a fluorescence pattern is detected, a certain subgroup of bullous autoimmune dermatoses can thus possibly be taken into consideration, such as the bullous pemphigoid, which is the most common bullous autoimmune dermatosis in Europe. In other words: If a fluorescence is present along the so-called bubble roof BD, this can be an indication of two specific target antigens, which can in turn be an indication of a bullous pemphigoid.

If a presence of a fluorescence pattern is preferably detected in a specific boundary area, which is preferably the bubble floor BB, this can be an indication of rarer pemphigoid diseases outside the group of the bullous pemphigoid, such as an epidermolysis bullosa acquisita.

Preferably, the confidence measure is furthermore output.

Preferably, the confidence measure is determined in such a manner that initially for a respective partial image a respective partial image confidence measure is determined via the second neural network and then the confidence measure is determined on the basis of the partial image confidence measures.

The multiple partial image areas are preferably selected in a randomly based manner from the immunofluorescence image along the boundary area.

Preferably, a respective brightness value is furthermore determined by the second neural network for a respective partial image and then an overall brightness value is determined on the basis of these respective brightness values.

Preferably, the segmentation information is furthermore determined in such a manner that the segmentation information includes the first, the second, and furthermore a third segmentation area. The third segmentation area preferably represents a third cell substrate area. The determination of the segmentation information also follows here via segmentation of the immunofluorescence image using the first neural network. The multiple partial images (TB1, . . . , TBX) are preferably partial images of a first type. Furthermore, a second boundary area, which represents a second transition from the second cell substrate towards the third cell substrate, is preferably determined on the basis of the segmentation information. Preferably, multiple partial images of a second type are furthermore selected from the immunofluorescence image along the second boundary area. Preferably, a second confidence measure of a presence of a second fluorescence pattern is determined on the basis of the multiple partial images of the second type via a third neural network.

Furthermore, a method for digital image processing is proposed, comprising the following steps: providing an immunofluorescence image, which represents a staining of a biological cell substrate by a fluorescence stain, determining segmentation information including at least one first and one second segmentation area, wherein the segmentation areas each represent a respective cell substrate area, via segmentation of the immunofluorescence image using a first neural network, determining a boundary area, which represents a transition from the first cell substrate area towards the second cell substrate area in the fluorescence image, on the basis of the segmentation information, selecting multiple partial images from the immunofluorescence image along the boundary area, determining a confidence measure of a presence of the fluorescence pattern on the basis of the multiple partial images via a second neural network.

Furthermore, a computer program product is proposed comprising commands which, upon the execution of the program by a computer, prompt it to carry out the method for digital image processing.

Furthermore, a data carrier signal is proposed which transmits the computer program product.

Furthermore, a device is proposed for detecting at least one fluorescence pattern on an immunofluorescence image of a biological cell substrate.

The device includes at least one computing unit, which is designed to carry out the following steps: determining segmentation information including at least one first and one second segmentation area, wherein the segmentation areas each represent a respective cell substrate area, via segmentation of the immunofluorescence image using a first neural network, determining a boundary area, which represents a transition from the first cell substrate area towards the second cell substrate area in the fluorescence image, on the basis of the segmentation information, selecting multiple partial images from the immunofluorescence image along the boundary area, determining a confidence measure of a presence of the fluorescence pattern on the basis of the multiple partial images via a second neural network.

Furthermore, a computing unit is proposed which is designed to carry out the following steps in the course of digital image processing: accepting an immunofluorescence image, which represents a staining of a biological cell substrate by a fluorescence stain, determining segmentation information including at least one first and one second segmentation area, wherein the segmentation areas each represent a respective cell substrate area, via segmentation of the immunofluorescence image using a first neural network, determining a boundary area, which represents a transition from the first cell substrate area towards the second cell substrate area in the fluorescence image, on the basis of the segmentation information, selecting multiple partial images from the immunofluorescence image along the boundary area, determining a confidence measure of a presence of the fluorescence pattern on the basis of the multiple partial images via a second neural network.

Furthermore, a data network device is proposed, comprising at least one data interface for accepting a fluorescence image, which represents a staining of a cell substrate by a fluorescence stain, and furthermore comprising at least one computing unit, which is designed to carry out the following steps in the course of digital image processing: determining segmentation information including at least one first and one second segmentation area, wherein the segmentation areas each represent a respective cell substrate area, via segmentation of the immunofluorescence image using a first neural network, determining a boundary area, which represents a transition from the first cell substrate area towards the second cell substrate area in the fluorescence image, on the basis of the segmentation information, selecting multiple partial images from the immunofluorescence image along the boundary area, determining a confidence measure of a presence of the fluorescence pattern on the basis of the multiple partial images via a second neural network.

The invention is explained in more detail hereinafter on the basis of special embodiments without restriction of the general concept of the invention on the basis of the figures. In the figures:

FIG. 2a shows a further fluorescence image,

FIG. 2b shows segmentation information,

FIG. 2c shows boundary areas,

Figure 3:
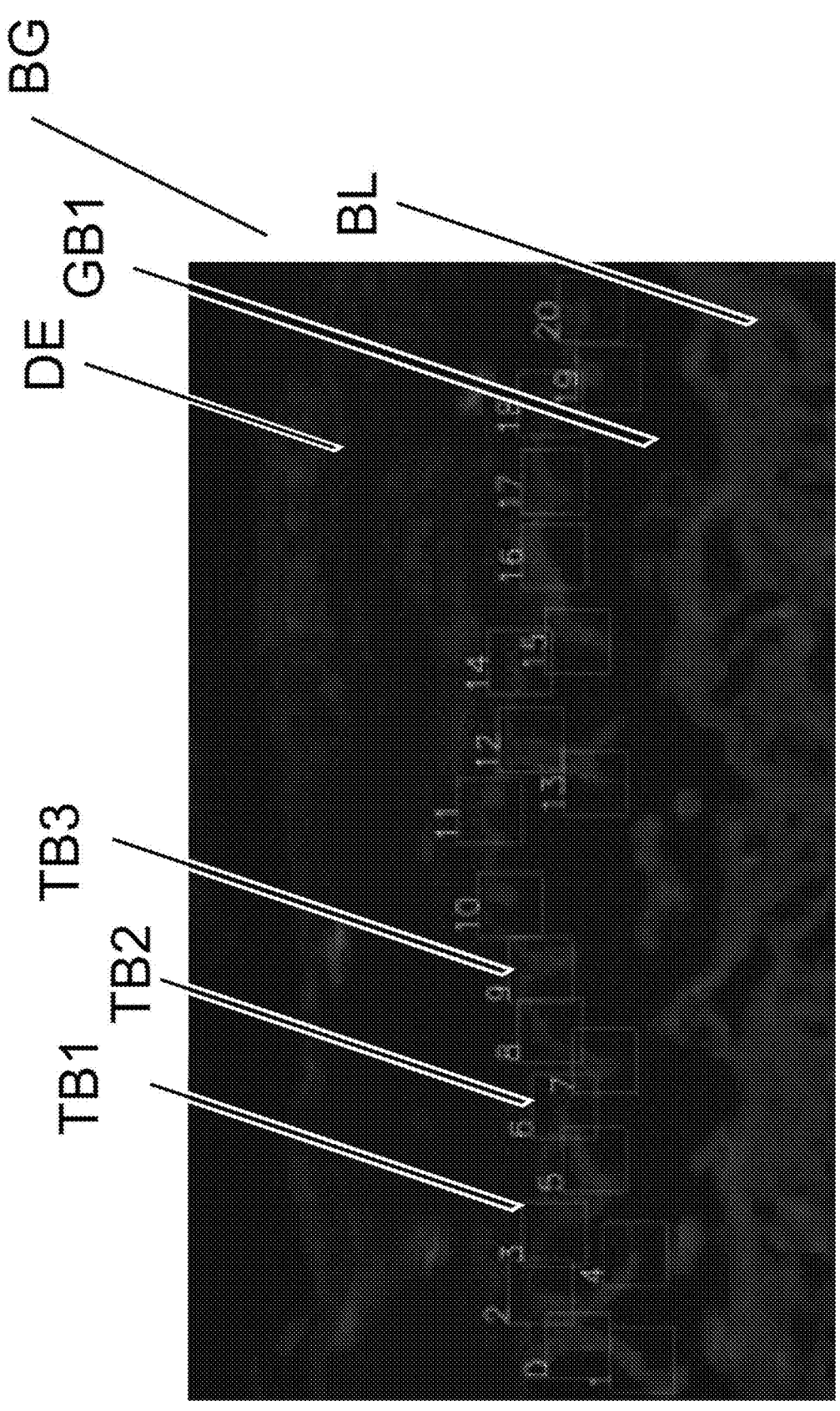
Figure 4A:
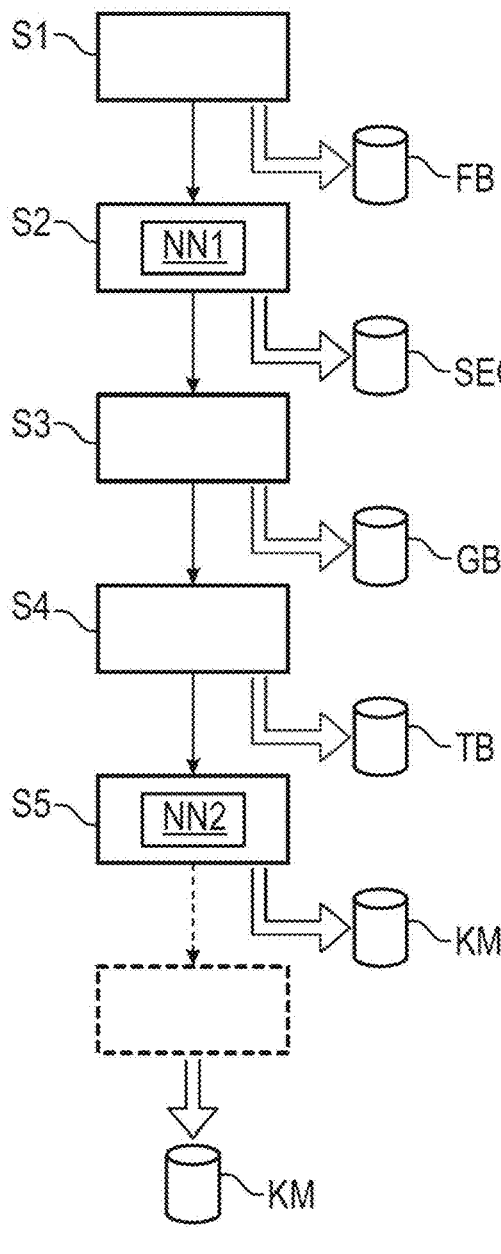
Figure 4B:
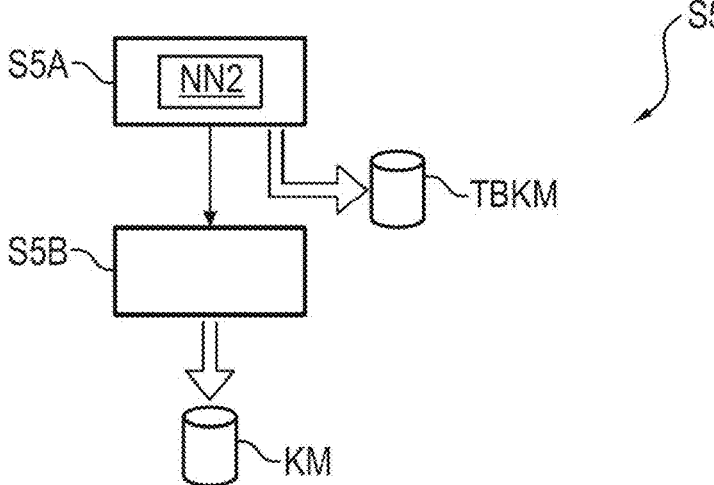
Figure 5:
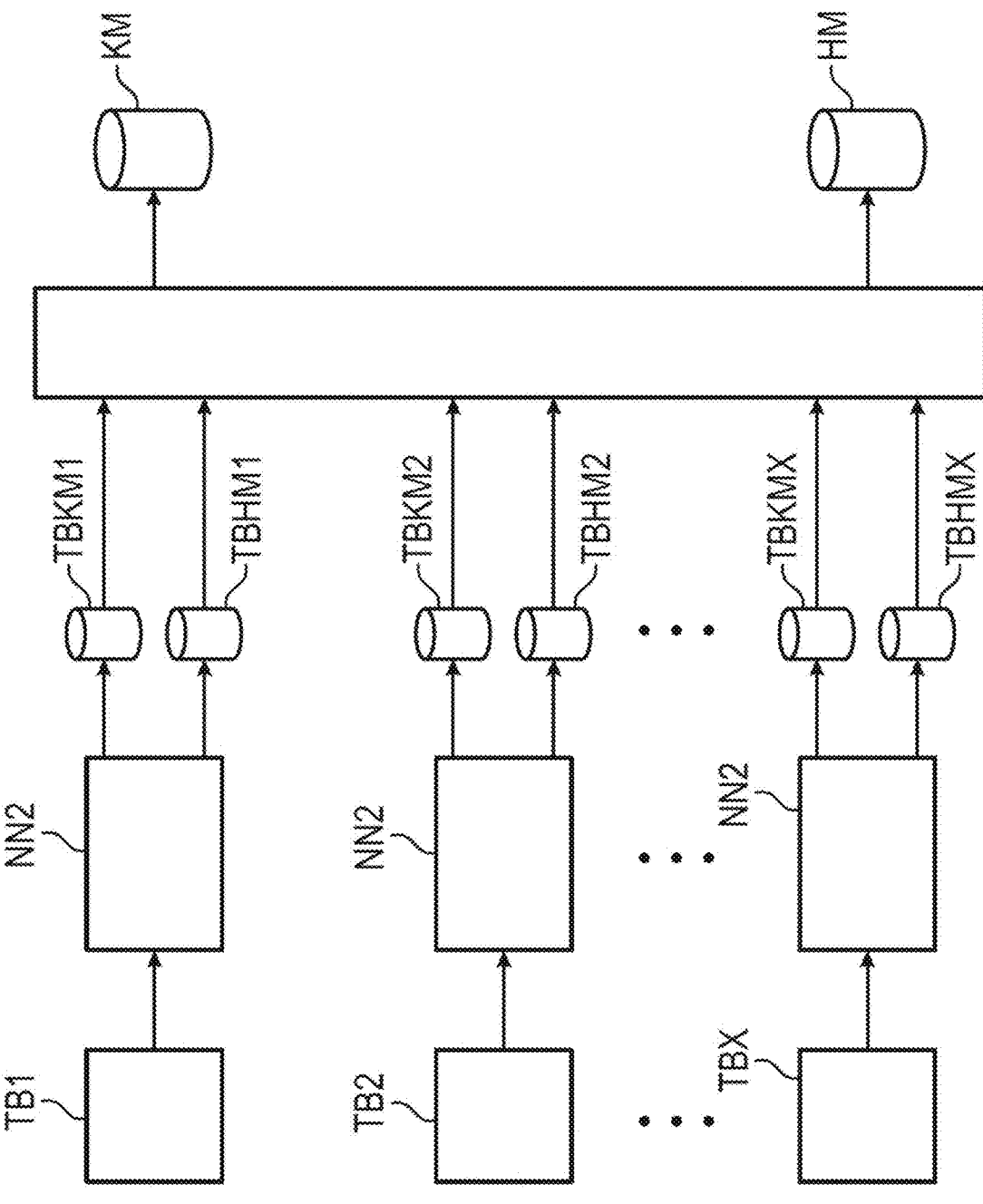
Figure 6A:
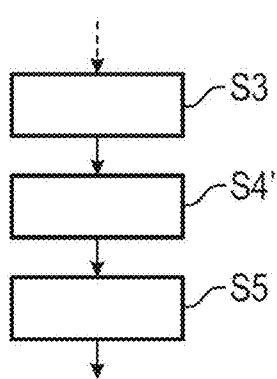
Figure 6B:
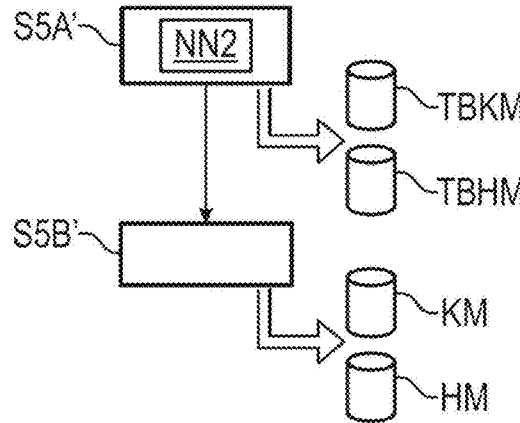
Figure 6C:
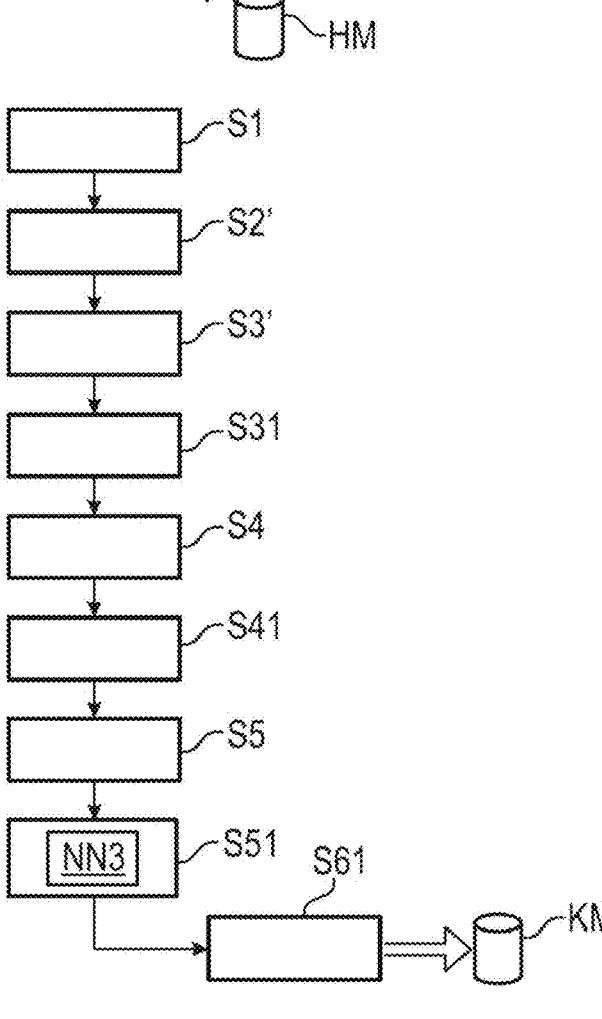
Figure 7:
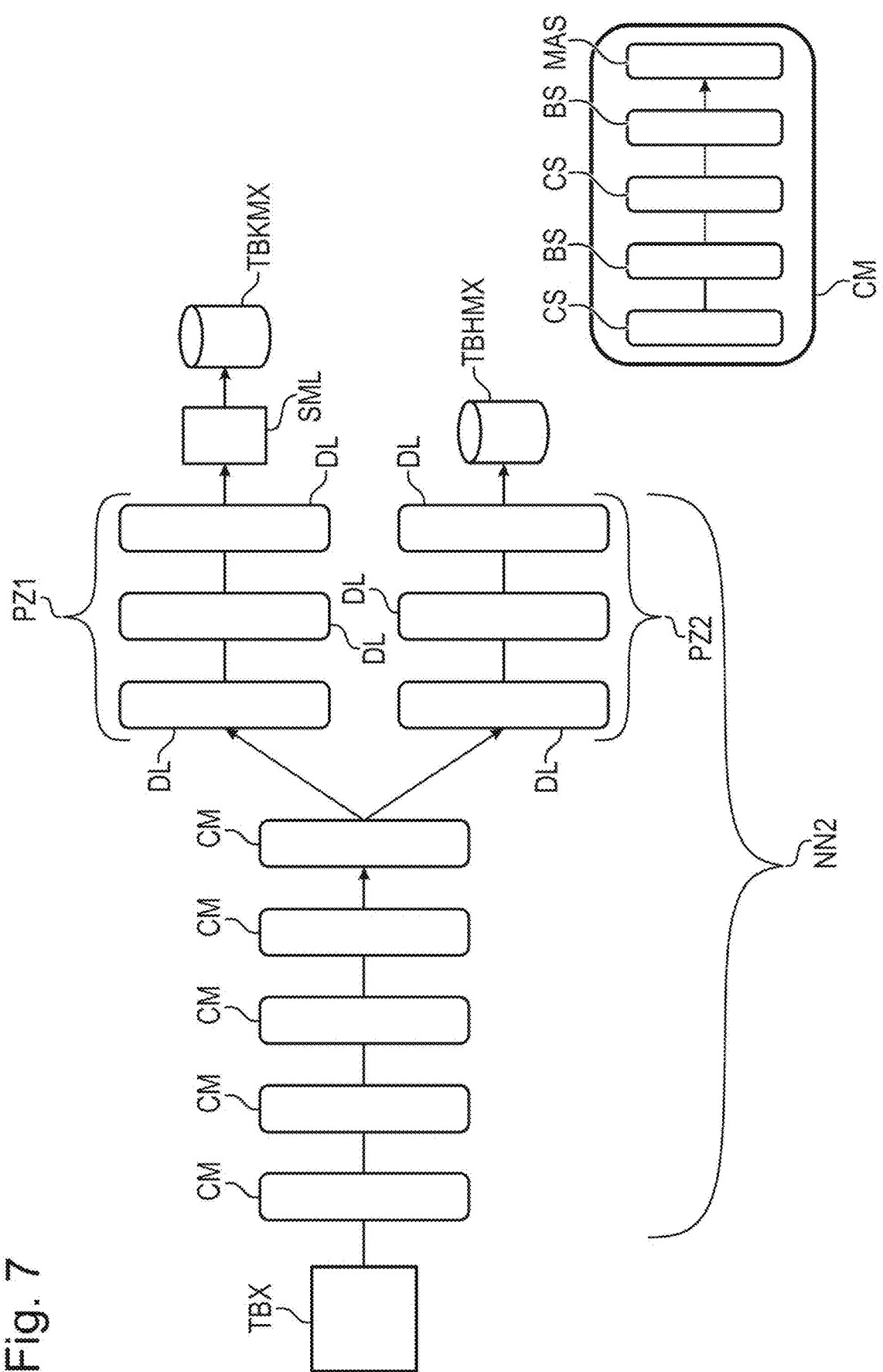
Figure 8:
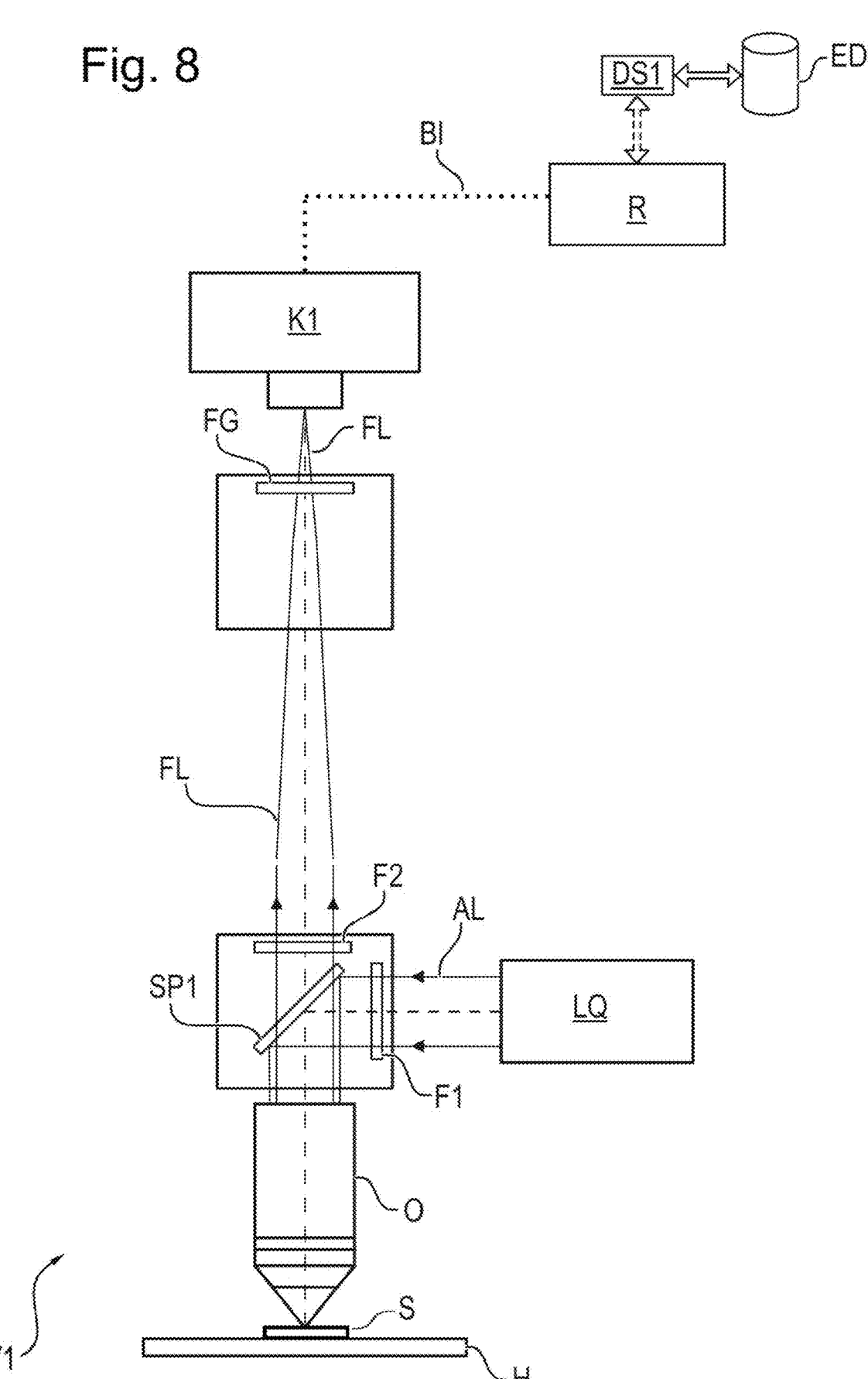
Figure 9:
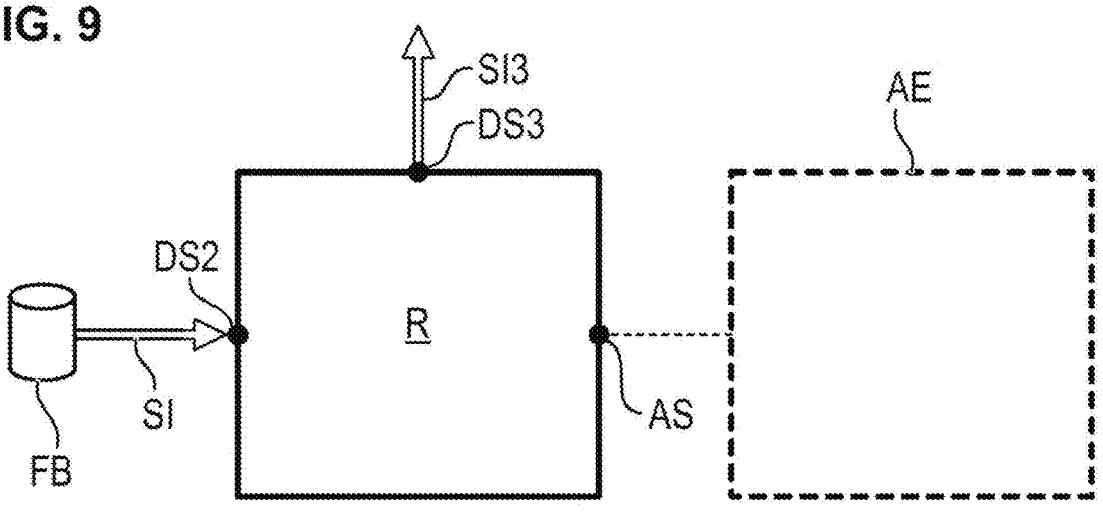
Figure 10:
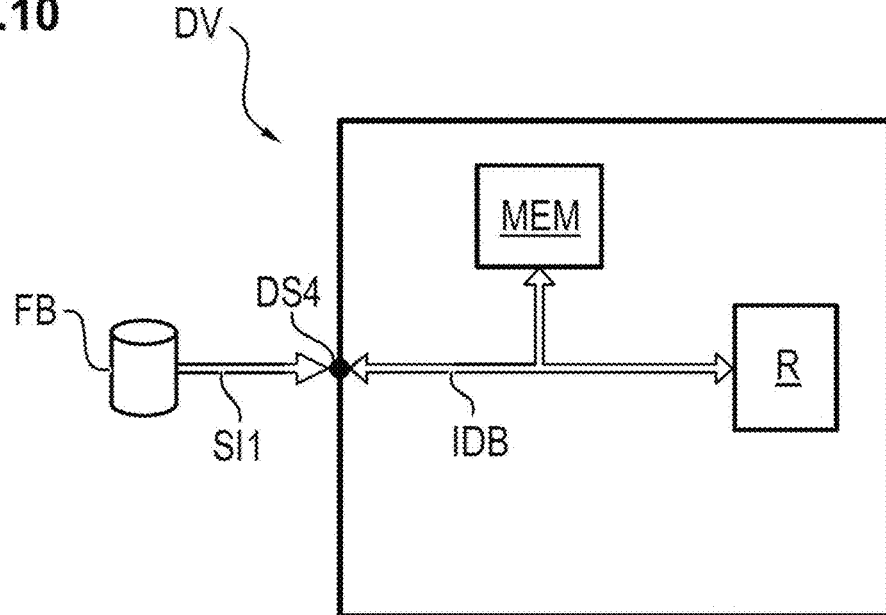
Figure 11:
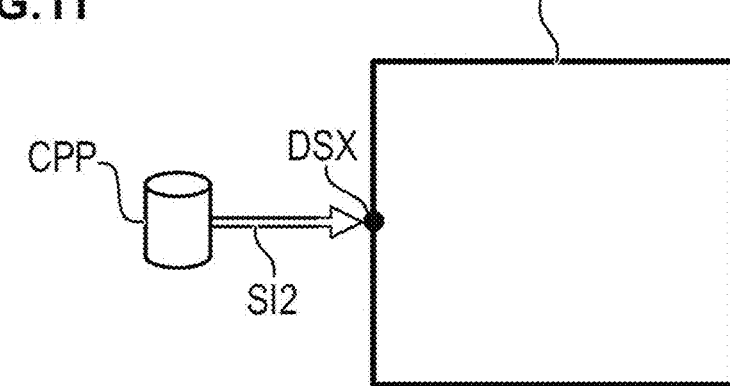

FIG. 3 shows partial images of a fluorescence value selected along a boundary area, FIG. 4a shows a few steps of a preferred embodiment of the proposed method, FIG. 4b shows preferred partial steps for determining a confidence measure according to a preferred embodiment, FIG. 5 shows steps for determining partial image confidence measures and partial image brightness measures and also a confidence measure and a brightness measure according to a preferred embodiment of the invention, FIGS. 6a, 6b, 6c show steps preferably to be carried out of a preferred embodiment of the proposed method, FIG. 7 shows an exemplary structure of a second neural network, FIG. 8 shows a preferred embodiment of a device according to the invention, FIG. 9 shows a preferred embodiment of a computing unit according to the invention, FIG. 10 shows a preferred embodiment of a data network device according to the invention, FIG. 11 shows a preferred embodiment of a computer program product according to the invention and a proposed data signal, FIG. 12 shows experimental results.

Exemplary embodiments described herein are not to be understood as a restriction of the invention. Rather, additions and modifications are certainly also possible in the scope of the present disclosure, in particular those which, for example, by combination or modification of individual features or method steps described in conjunction with the general or special description part and included in the claims and/or the drawings, can be inferred by a person skilled in the art with regard to achieving the object and result by way of combinable features in new subject matter or new method steps or method step sequences.

Figure 1:
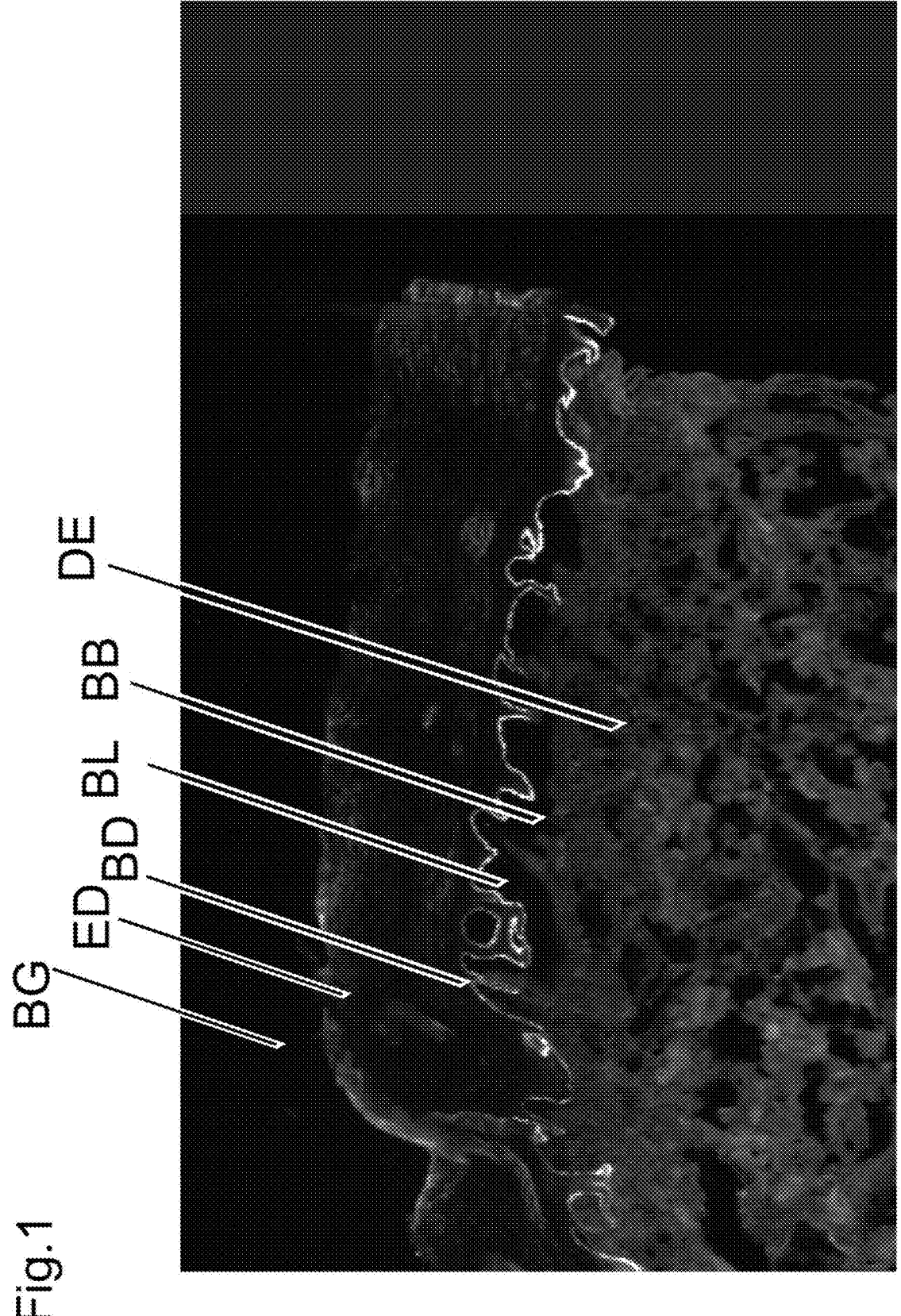
FIG. 1 shows an overall fluorescence image.

As described above, FIG. 1 shows a fluorescence image FB, which can be analysed via the method according to the invention. The fluorescence image FB shows a fluorescence of a cell substrate. The cell substrate is preferably a skin substrate of a primate. In particular, the skin substrate includes a dermis and an epidermis. The substrate area ED shows the area of the epidermis, wherein the substrate area DE shows the area of the dermis. The intermediate space between epidermis and dermis can be seen as an intermediate space or bubble BL. The boundary area BD as the bubble roof between epidermis and the intermediate space or bubble BL shows a fluorescence in this example.

The boundary area of the so-called bubble floor BD between the intermediate space or bubble BL and the dermis DE shows no fluorescence in this example.

FIG. 4a shows a preferred sequence of steps for carrying out the method according to the invention. In a step S1, the cell substrate is incubated with a liquid patient sample, which potentially includes primary antibodies, and furthermore with secondary antibodies, which are marked with a fluorescence stain, furthermore the cell substrate is irradiated using excitation radiation and furthermore the immunofluorescence image is captured.

Figures 2A, 2B, 2C:
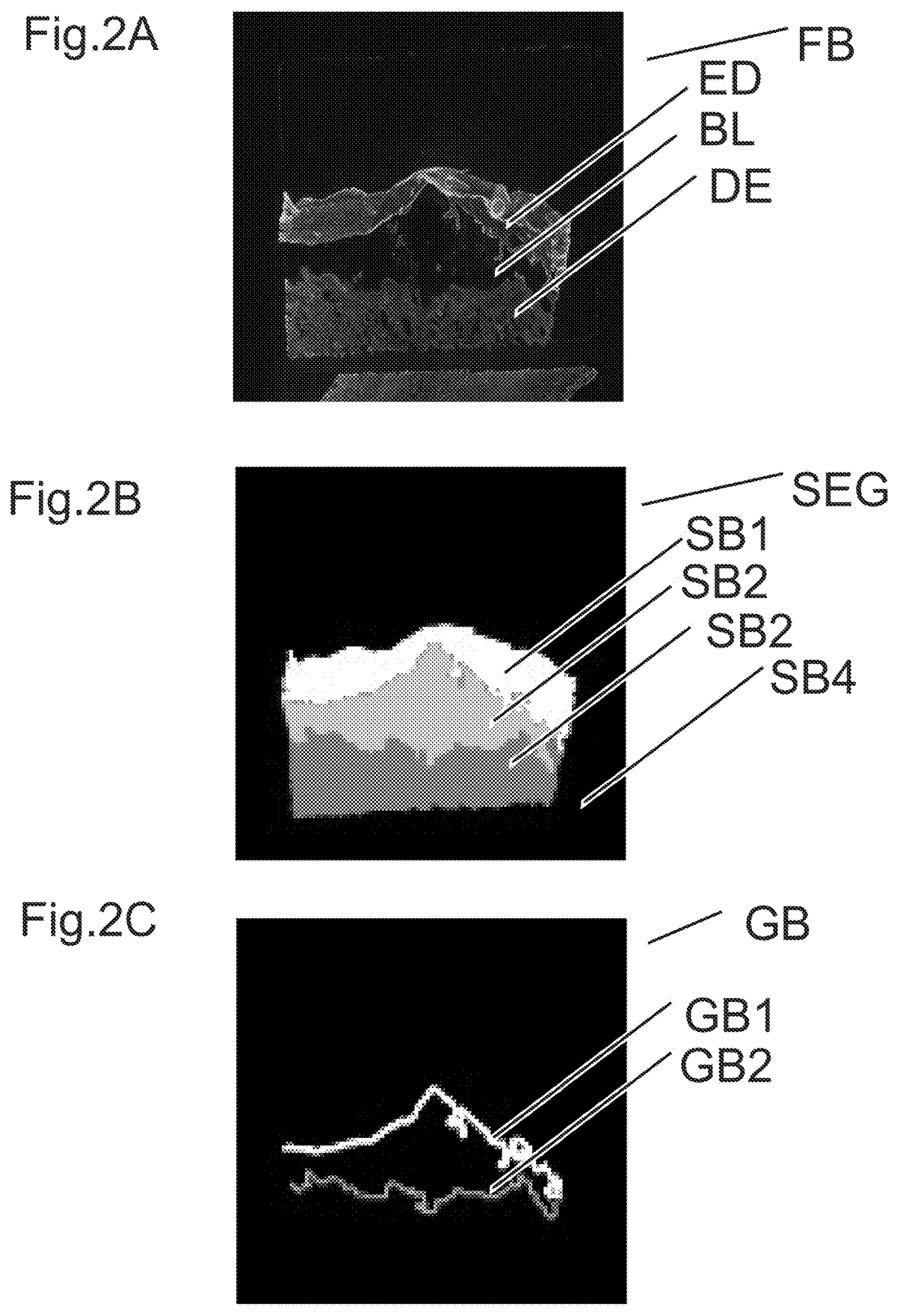

Further following steps S2 to S5 are steps of a digital image processing method which can be summarized as steps SD. In a step S2, segmentation information SEG is determined using a neural network NN1. This is carried out on the basis of the fluorescence image FB. An exemplary fluorescence image FE is shown in FIG. 2a. The area of the epidermis ED, the area of the dermis DE, and the area of the intermediate space or the bubble EL can be seen clearly. In step S2, the segmentation information SEG is now determined, which is shown by way of example in FIG. 2b. The segmentation information SEG includes a first segmentation area SB1, which represents the cell substrate area of the epidermis ED. Furthermore, the segmentation information SEG includes a second segmentation area SB2, which preferably represents the area EL of the intermediate space or the area of the bubble. The segmentation information SEG can preferably furthermore include a third segmentation area SB3, which represents a third cell substrate area in the form of the dermis DE. The segmentation information SEG preferably furthermore includes a segmentation area SB4, which represents is a background.

In that according to the invention the segmentation information SEG is determined by a first neural network and then the second neural network determines the confidence measure of the presence of the fluorescence pattern on the basis of multiple partial images of the immunofluorescence image, which are determined via the segmentation information SEG or indirectly on the basis of the segmentation information SEG, the first neural network solely has to be trained to identify segmentation areas which represent respective cell substrate areas and output them as information. Only later does the second neural network then have to determine the confidence measure of the presence of the fluorescence pattern on the basis of the selected partial images. A single neural network thus does not have to simultaneously perform the identification task of identifying the substrate areas or segmentation areas and also the detection task of determining the confidence measure of the presence of the fluorescence pattern, rather these partial tasks are distributed according to the invention to two neural networks in a particular manner. The method is therefore particularly high-performance.

According to FIG. 4a, in a step S3, at least one boundary area is determined, which represents a transition from the first cell substrate area towards the second cell substrate area in the fluorescence image, on the basis of the segmentation information SEG. This determined and detected boundary area can then be provided as information GB by step S3.

FIG. 2c shows for this purpose exemplary boundary area information GB, which indicates as a boundary area GB1 here preferably a transition from the first cell substrate area in the form of the epidermis ED towards the second cell substrate area in the form of the intermediate space or the bubble BL.

In a further step, a second boundary area GB2 can preferably be determined, which represents a second transition from the second cell substrate area in the form of the intermediate space or the bubble BL towards the third cell substrate area in the form of the dermis DE.

According to FIG. 4a, in a step S4, multiple partial images can then be selected along the boundary area, in particular along the first boundary area GB1. FIG. 3 shows for this purpose by way of example for a detail FBA of the fluorescence image SB once again the area of the epidermis ED, the area of the intermediate space or the bubble BL, and also the area GB1 as the boundary area. Along the boundary area GB1, partial images, such as the partial images TB1, TB2, TB3, are selected from the fluorescence image FB. Further partial images are indexed here with indices from 0-20 in the image detail FBA.

The confidence measure KM is determined according to FIG. 4a in step S5 using the second neural network NN2.

In that according to the invention the entire fluorescence image FB does not have to be analysed by the second neural network, but rather only respective partial images which were selected along the boundary area GB1 are analysed by the second neural network in order to determine the confidence measure, the second neural network only has to be trained for image information which is given by partial images of a boundary area, such as the boundary area GB1. The second neural network can therefore be trained particularly reliably to determine the confidence measure of the presence of the fluorescence pattern particularly reliably. If a complete fluorescence image FB or also a complete image detail FBA were completely analysed by the second neural network, significantly more information would thus have to be processed by the second neural network and therefore higher degrees of freedom would be taken into consideration in the training of the second neural network and also in the design of the second neural network. Such a procedure would be accompanied by a reduced reliability of the determination result of the confidence measure of the presence of the fluorescence pattern.

In a step S6 which is preferably to be carried out, the confidence measure KM is output. The confidence measure can be a percentage specification in a range from 0 to 100%, which presents the confidence measure. Alternatively, the confidence measure can preferably be a value from the value range from 0 to 1. According to a further preferred embodiment, the confidence measure can be output in the form of information "YES" or "NO".

This output of the confidence measure KM can take place as an output via providing a data element KM. Alternatively, this output can take place in that the confidence measure is displayed to the user on a display unit of a computer unit.

FIG. 4b shows a preferred embodiment for carrying out step S5, in which in a first step S5A initially a respective partial image confidence measure is determined for a respective partial image via the second neural network NN2.

Subsequently, in a further step S5B, the confidence measure KM is determined on the basis of the partial image confidence measures TBKM.

FIG. 5 shows an exemplary structure for this purpose, in which partial images TB1, TB2, . . . , TBX are each separately analysed as such or each individually per partial image via the second neural network NN2. The respective partial image confidence measures TBKM1, TBKM2, . . . , TBKMX are then the result. In a further step S5B, the confidence measure KM is then determined on the basis of the partial image confidence measures TBKM.

In that the second neural network NN2 only processes a single partial image separately in each case to determine a respective partial image confidence measure, the second neural network can be trained particularly specifically for analysing partial images TB1, TB2, . . . , TX. Furthermore, the second neural network NN2 only has to analyse image information of a single partial image in the course of the analysis in a processing pass and simply does not have to jointly consider all image information of all partial images in this processing sequence. The method is therefore particularly reliable with respect to the final determination of the final confidence measure KM.

The selection of the partial images TB1, TB2, . . . , TBX along the boundary area GB1, as shown in FIG. 3, can preferably be carried out in a randomly based manner. In particular, this selection can take place via sampling methods according to the Poisson disc method.

Introduction to Determining the Boundary Areas:

In consideration of the segmentation information SEG from FIG. 2, preferably the following method can be used to determine the boundary areas GB1, GB2. Preferably, a respective segmentation area SB1, . . . , SB3 is expanded in area via a dilatation. To determine the boundary area GB1, as shown in FIG. 2c, an overlap of the area SB1 expanded by dilatation with at least the area SB2 expanded by dilatation can then preferably be observed. Preferably, the boundary area GB1 is determined in that an overlap of the area SB1 expanded via dilatation with at least one of the other areas SB2 or SB3 expanded via dilatation is observed. In particular, a set of pixels of the boundary area GB1 can be described on the basis of a dilatation operator and the respective pixel sets SB1, SB2, SB3 as $$GB1 = (DIL(SB1) \cap (DIL(SB2) \cup DIL(SB3))$$

To determine the boundary area GB2, as shown in FIG. 2c, an overlap of the area SB3 expanded via dilatation with at least the area SB2 expanded via dilatation can then preferably be observed. Preferably, the boundary area GB2 is determined in that an overlap of the area SB3 expanded via dilatation with at least one of the other areas SB2 or SB1 expanded via dilatation is observed. In particular, a set of pixels of the boundary area GB2 can be described on the basis of a dilatation operator and the respective pixel sets SB1, SB2, SB3 as $$GB2 = (DIL(SB3) \cap (DIL(SB1) \cup DIL(SB2))$$

The randomly based selection of the multiple partial image areas is represented in FIG. 6a by a modified step S4'.

The advantage of a randomly based selection of the partial image area is that such a randomly based selection of the partial image areas also introduces a higher variance of the data of the partial images during the training, in order to avoid over-fitting in the case of an excessively small training set.

According to FIG. 5, the second neural network preferably furthermore determines, for a respective partial image, a respective brightness value or a respective brightness measure HM1, HM2, . . . HMX. This can take place in a modified step S5A', as also shown in FIG. 6b.

Then, according to FIG. 5, in a modified step S5B', which is also shown in FIG. 6*b*, the brightness value or the overall brightness value HM can be determined on the basis of the respective brightness values.

This is advantageous since a determination of the partial image confidence measures and the information of the respective brightness values in a common neural network NN2 allows better generalization of the network.

FIG. 7 shows a preferred structure of the neural network NN2. The neural network NN2 analyses a respective partial image TB and determines, for a respective partial image TB, a respective partial image confidence measure TBKMX. Furthermore, the neural network NN2 preferably determines, as already previously explained, a respective partial image brightness measure TBHM.

For this purpose, the neural network NN2 can make use of a sequence of respective convolutional modules CM. A respective convolutional module CM preferably includes for this purpose a sequence of a convolutional step CS, a batch normalization step BS, a further convolutional step CS, and a further batch normalization step BS, followed by a max pooling step MAS.

Multiple such convolutional modules CM can follow one another.

The last convolutional module can then preferably be followed in a processing branch PZ1 by further processing via multiple dense layers DL, also called fully connected layers, and finally via a softmax layer SML to determine the partial image confidence measure TBKMX.

Preferably, in a further processing branch PZ2, a sequence of multiple dense layers DL2 can take place to determine the partial image brightness measure TBHM.

Preferably, for each partial image TBX with index 1=x . . . X, such a partial image confidence measure TBKMX is determined, which as a tuple $TBKM_x$ consists of multiple labels according to $$TBKM_x = \{f_{pos}(TB_x), f_{neg}(TB_x), f_{unci}(TB_x), f_{back}(TB_x)\}$$

with
$f_{pos}(TB_x)$ probability that the partial image is positive (fluorescence is present)
$f_{neg}(TB_x)$ probability that the partial image is negative (fluorescence is not present)
$f_{unci}(TB_x)$ probability that the partial image is not assignable
$f_{back}(TB_x)$ probability that the partial image shows a background If a tuple $TBKM_x$ for a partial image $TB_x$ has a positive probability as the highest probability value, the partial image $TB_x$ is classified as positive and assigned to the set P of all positive partial images. If a tuple $TBKM_x$ for a partial image $TB_x$ has a negative probability as the highest probability value, the partial image $TB_x$ is thus classified as negative and assigned to the set N of all negative partial images. If a tuple $TBKM_x$ for a partial image $TB_x$ has a probability for the class "not assignable" as the highest probability value, the partial image $TB_x$ is classified as not assignable. If a tuple $TBKM_x$ for a partial image $TB_x$ has a probability for the class "background" as the highest probability value, the partial image $TB_x$ is classified as background. Partial images of the classes "not assignable" and "background" are not considered hereinafter.

On the basis of the partial image confidence measures or the tuples $TBKM_x$ of the partial images $TB_x$, which were classified as positive or negative, the confidence measure KM of the presence of the fluorescence pattern can then be determined as a scalar value y in the value range $$y \in [0, 1]$$

as $$y = \frac{1 + y_{neg} - y_{pos}}{2}$$

with $$y_{neg} = \frac{\sum_{i \in N} f_{neg}(TB_i)}{|N|}$$

on the basis of all negative partial images $TB_i$ from the set N with $i \in N$ and with $$y_{pos} = \frac{\sum_{i \in N} f_{pos}(TB_i)}{|P|}$$

on the basis of all positive partial images $TB_i$ from the set P with $i \in P$.

Furthermore, to ascertain the brightness measure HM as the scalar value b, the three partial images $TB_i$ having the highest positive probability $f_{pos}(TB_i)$ are assigned to a set P3 and considered in that their partial image brightness measures TBHM or partial brightness values $b_i$ are aggregated according to $$b = \frac{\sum_{i \in P} b_i}{|P_3|}$$

FIG. 6*c* shows a modified sequence of steps of the method according to the invention according to one preferred embodiment. In second step S2' provided therein, the segmentation information is determined, which includes the first, the second, and the third segmentation area. The multiple partial images are preferably partial images of a first type.

By using the above-described step S3 and a further step S31, the first boundary area is determined and also the second boundary area is determined, which represents a second transition from the second cell substrate area towards the third cell substrate area. Furthermore, by carrying out the above-described step S4 and carrying out a further step S41, multiple partial images of the second type are also then selected from the immunofluorescence image along the second boundary area.

By carrying out the above-described step S5 and also the further, additional step S51, a second confidence measure of a presence of a second fluorescence pattern is then determined on the basis of the multiple partial images of the second type via a third neural network NN3.

The second confidence measure KM2 can preferably be output in a step S61.

Because in this preferred embodiment of the method both a confidence measure of a presence of a fluorescence pattern along the first boundary area and a second confidence measure of a second presence of a second fluorescence pattern along the boundary area are determined and can preferably also be output, advantageous acquisition of information is enabled for certain cases. The first boundary area GB1 can preferably be designated as a so-called bubble roof and the second boundary area preferably as a so-called bubble floor, as also explained in detail in FIG. 1.

If presences of fluorescence patterns or their confidence measures are determined for both boundary areas and provided or output, a clinician can thus preferably evaluate this information in a special manner. If a fluorescence pattern is in principle only present on the bubble roof, it can then thus probably be a bullous pemphigoid. If only the bubble floor fluoresces, rarer pemphigoid diseases outside the group of bullous pemphigoid thus come into consideration, i.e., in particular a non-bullous pemphigoid disease, such as epidermolysis bullosa acquisita.

If there is fluorescence along the bubble floor and the bubble roof, thus along both boundary areas, a pemphigoid disease thus comes into consideration in principle.

This particular embodiment of the proposed method is thus helpful to be able to differentiate further with respect to possible primary antibodies or their presences in the patient sample, which can possibly be advantageous for the clinician for a differentiation in the diagnostics.

The method proposed herein is thus in particular a method for detecting at least one fluorescence pattern on an immunofluorescence image of a biological cell substrate for obtaining information with regard to a possible pemphigoid disease. In one particular embodiment, the method is a method for obtaining information with respect to a possible bullous pemphigoid disease. In a further particular embodiment, the method is a method for obtaining information with respect to a possible non-bullous pemphigoid disease. In still a further particular embodiment, the method is a method for obtaining information with respect to a possible non-bullous pemphigoid disease or bullous pemphigoid disease.

The biological cell substrate is preferably a skin substrate of a primate. The skin substrate of a primate is preferably a skin substrate of a monkey. The skin substrate of a primate preferably includes an epidermis and a dermis. The skin substrate of a primate is preferably a so-called salt-split skin having a bubble between epidermis and dermis.

FIG. 8 shows a device V1, via which the method according to the invention can preferably be carried out. The device V1 can be designated as a fluorescence microscope. The device V1 includes a holder H for a substrate S or an object carrier having such a substrate S, which was incubated in the above-described manner. Excitation light AL of an excitation light source LQ is conducted towards the substrate S via an optical unit O. Resulting fluorescence radiation FL is then transmitted back through the optical unit O and passes the dichroic mirror SP1 and an optional optical filter F2. The fluorescence radiation FL preferably passes an optical filter FG, which filters out a green channel. A camera K1 is preferably a monochromatic camera, which then captures the fluorescence radiation FL in a green channel if an optical filter FG is present. According to an alternative embodiment, the camera K1 is a colour image camera, which manages without using the optical filter FG and captures the fluorescence image in the corresponding colour channel as a green channel via a Bayer matrix. The camera K1 provides the image information BI or the fluorescence image to a computing unit R, which processes this image information BI. The computing unit R can preferably output or provide data DE, such as a fluorescence image and/or confidence measures, via a data interface DS1.

FIG. 9 shows a computing unit according to the invention, which, according to a preferred embodiment, preferably accepts a fluorescence image FB as a data signal SI via a data interface DS2. The computing unit R can then ascertain the above-described items of information and provide them via a data interface DS3 as a data signal SI3. This can preferably take place via a wired or wireless data network. The computing unit R particularly preferably includes an output interface AS for outputting the information via an output unit AE. The output unit AE is preferably a display unit for an optical display of the abovementioned information.

FIG. 10 shows a data network device DV according to the invention according to one preferred embodiment. The data network device DV accepts the fluorescence image FB as a data signal SI1 via a data interface DS4. The data network device DV includes an above-described computing unit R and a memory unit MEM. The computing unit R, a memory unit MEM, and also the data interface DS4 are preferably connected to one another via an internal is data bus IDB.

FIG. 11 shows an embodiment of a proposed computer program product CPP. The computer program product CPP can have its data signal 512 accepted via a data interface DSX by a computer CO.

FIG. 12 shows experimental results under the label "combined" for the cell substrate of the salt-split skin for the positive case that in at least one of the two boundary areas GB1, in particular the bubble roof, or GB2, in particular the bubble floor, a fluorescence pattern is present. This also includes the case that a fluorescence is present in both boundary areas GB1, GB2. If a fluorescence is not present in any boundary area GB1, GB2, the case is assessed as negative. Of 32 actually positive fluorescence images, 31 images were identified as positive and 1 image as negative by the method according to the invention "EPa-Classifier". Of 77 actually negative fluorescence images, 4 images were identified as positive and 73 images as negative by the method according to the invention "EPa-Classifier". Overall, there were thus ("total") 109 images, of which 35 were identified as positive and 74 were identified as negative. The accuracy was 95.4%. The sensitivity ("PPA") was 96.9%. The specificity ("NPR") was 94.8%.

FIG. 12 furthermore shows experimental results under the label "epidermal" for the cell substrate of the salt-split skin for the positive case that in the first boundary area GB1, in particular the bubble roof, a fluorescence pattern is present. This also includes the case that a fluorescence is present in both boundary areas GB1, GB2. If no fluorescence pattern is present in the boundary area GB1, the case is thus assessed as negative. Of 26 actually positive fluorescence images, 25 images were identified as positive and 1 image as negative by the method according to the invention "EPa-Classifier". Of 83 actually negative fluorescence images, 3 images were identified as positive and 80 images as negative by the method according to the invention "EPa-Classifier". Overall, there were thus ("total") 109 images, of which 28 were identified as positive and 81 were identified as negative. The accuracy was 96.3%. The sensitivity ("PPA") was 96.2%. The specificity ("NPA") was 96.4%.

FIG. 12 furthermore shows experimental results under the label "dermal" for the cell substrate of the salt-split skin for the positive case that a fluorescence pattern is present in the second boundary area GB2, in particular the bubble floor. This also includes the case that a fluorescence is present in both boundary areas GB1, GB2. Of 8 actually positive fluorescence images, 8 images were identified as positive and 0 images as negative by the method according to the invention "EPa-Classifier". Of 101 actually negative fluorescence images, 3 images were identified as positive and 98 images as negative by the method according to the invention "EPa-Classifier". Overall, there were thus ("total") 109 images, of which 11 were identified as positive and 98 as negative. The accuracy was 97.3%. The sensitivity ("PPA") was 100.0%. The specificity ("NPA") was 97.0%.

Depending on the specific implementation requirements, exemplary embodiments of the invention can be implemented in hardware or in software. The implementation can be carried out using a digital storage medium, for example, a floppy disc, a DVD, a Blu-ray disc, a CD, a ROM, a PROM, an EPROM, an EEPROM, or a FLASH memory, a hard drive, or another magnetic or optical memory, on which electronically readable control signals are stored which can interact or interact with a programmable hardware component in such a way that the respective method is carried out.

A programmable hardware component, in particular a computing unit, can be formed by a processor, a computer processor (CPU=Central Processing Unit), a graphics processor (GPU=Graphics Processing Unit), a computer, a computer system, an application-specific integrated circuit (ASIC), an integrated circuit (IC), a one-chip system (SOC=System on Chip), a programmable logic element, or a field-programmable gate array having a microprocessor (FPGA).

The digital storage medium can therefore be machine-readable or computer-readable. Some exemplary embodiments thus comprise a data carrier which has electronically readable control signals which are capable of interacting with a programmable computer system or a programmable hardware component in such a way that one of the methods described herein is carried out. One exemplary embodiment is thus a data carrier (or a digital storage medium or a computer-readable medium), on which the program for carrying out one of the methods described herein is recorded.

In general, exemplary embodiments of the present invention can be implemented as a program, firmware, computer program, or computer program product having a program code or as data, wherein the program code or the data is or are active so as to carry out one of the methods when the program runs on a processor or a programmable hardware component. The program code or the data can also be stored, for example, on a machine-readable carrier or data carrier. The program code or the data can be provided, inter alia, as source code, machine code, or byte code and as other intermediate code.

A further exemplary embodiment is furthermore a data stream, a signal sequence, or a sequence of signals which represent(s) the program for carrying out one of the methods described herein. The data stream, the signal sequence, or the sequence of signals can be configured, for example, so as to be transferred via a data communication connection, for example, via the Internet or another network. Exemplary embodiments are thus also signal sequences representing data which are suitable for transmission via a network or data communication connection, wherein the data represent the program.

A program according to one exemplary embodiment can implement one of the methods during its performance, for example, in that it reads memory locations or writes one datum or multiple data therein, by which switching processes or other processes can possibly be induced in transistor structures, in amplifier structures, or in other electrical, optical, magnetic components or components operating according to another functional principle. Accordingly, by reading out a memory location, data, values, sensor values, or other items of information can be captured, determined, or measured by a program. A program can therefore capture, determine, or measure variables, values, measured variables, and other items of information by reading out one or more memory locations.

The invention claimed is:

1. Method for detecting at least one fluorescence pattern on an immunofluorescence image of a biological cell substrate, comprising:

incubating the cell substrate(S) with a liquid patient sample, which potentially includes primary antibodies, and furthermore with secondary antibodies, which are marked using a fluorescence stain, irradiating the cell substrate using excitation radiation, and capturing the immunofluorescence image (FB), wherein the cell substrate is a skin substrate in the form of a salt-split skin comprising an epidermis, a dermis and a bubble between the epidermis and the dermis, determining segmentation information (SEG) comprising at least one first and one second segmentation area (SEG1, SEG2), wherein the segmentation areas each represent a respective cell substrate area (D, BL), via segmentation of the immunofluorescence image (FB) using a first neural network (NN1), determining a boundary area (GB1), which represents a transition from the first cell substrate area (D) towards the second cell substrate area (BL) in the fluorescence image (FB), on the basis of the segmentation information (SEG), wherein the boundary area is a bubble roof between the epidermis and the bubble or a bubble floor between the dermis and the bubble, selecting multiple partial images (TB1, . . . , TBX) from the immunofluorescence image (FB) along the boundary area (GB1), determining a confidence measure (KM) of a presence of the fluorescence pattern on the basis of the multiple partial images (TB1, . . . , TBX) via a second neural network (NN2).

2. Method according to claim 1, furthermore comprising outputting the confidence measure (KM).

3. Method according to claim 1, furthermore comprising determining a respective partial image confidence measure (TBKM1, . . . , TBKMX) for a respective partial image (TB1, . . . , TBX) via the second neural network (NN2) and determining the confidence measure (KM) on the basis of the partial image confidence measures (TBKMX).

4. Method according to claim 1, furthermore comprising randomly based selection of the multiple partial images (TB1, . . . , TBX) from the immunofluorescence image (FB) along the boundary area (GB1).

5. Method according to claim 1, furthermore comprising determining a respective brightness value (TBHM1, . . . , TBHMX) for a respective partial image (TB1, . . . , TBX) via the second neural network (NN2), determining an overall brightness value (HM) on the basis of the brightness values.

6. Method according to claim 1, wherein the multiple partial images (TB1, . . . , TBX) are partial images of a first type, furthermore comprising determining the segmentation information (SEG), comprising at least the first, the second, and furthermore a third segmentation area (SEG1, SEG2, SEG3), which represents a third cell substrate area (DE), via segmentation of the immunofluorescence image (FB) using the first neural network (NN1), determining a second boundary area (GB2), which represents a second transition from the second cell substrate area (BL) towards the third cell substrate area (DE) in the fluorescence image (FB), on the basis of the segmentation information (SEG), selecting multiple partial images of a second type from the immunofluorescence image along the second boundary area (GB2), determining a second confidence measure of a presence of a second fluorescence pattern on the basis of the multiple partial images of the second type via a third neural network (NN3).

7. Method for digital image processing, comprising:

providing an immunofluorescence image (FB), which represents a staining of a biological cell substrate by a fluorescence stain, wherein the biological cell substrate is a skin substrate in the form of a salt-split skin comprising an epidermis, a dermis and a bubble between the epidermis and the dermis, determining segmentation information (SEG) comprising at least one first and one second segmentation area (SEG1, SEG2), wherein the segmentation areas each represent a respective cell substrate area, via segmentation of the immunofluorescence image (FB) using a first neural network (NN1), determining a boundary area (GB1), which represents a transition from the first cell substrate area towards the second cell substrate area (BL) in the fluorescence image (FB), on the basis of the segmentation information (SEG), wherein the boundary area is a bubble roof between the epidermis and the bubble or a bubble floor between the dermis and the bubble, selecting multiple partial images (TB1, . . . , TBX) from the immunofluorescence image (FB) along the boundary area (GB1), determining a confidence measure (KM) of a presence of the fluorescence pattern on the basis of the multiple partial images (TB1, . . . , TBX) via a second neural network (NN2).

8. Computer program product (CPP), comprising commands which, upon the execution of the program by a computer, prompt it to carry out the method for digital image processing according to claim 7.

9. Data carrier signal (SI2), which transmits the computer program product (CPP) according to claim 8.

10. Device for detecting at least one fluorescence pattern on an immunofluorescence image (FB) of a biological cell substrate, comprising:

a holder (H) for an object carrier having the cell substrate(S), which was incubated with a patient sample, including the autoantibodies, and furthermore with secondary antibodies, which are each marked using a fluorescence stain, wherein the cell substrate(S) is a skin substrate in the form of a salt-split skin comprising an epidermis, a dermis and a bubble between the epidermis and the dermis, at least one camera (K1) for capturing a fluorescence image (SG) of the cell substrate(S)

and furthermore comprising at least one computing unit (R), which is designed to execute the following steps determining segmentation information (SEG) comprising at least one first and one second segmentation area (SEG1, SEG2), wherein the segmentation areas each represent a respective cell substrate area, via segmentation of the immunofluorescence image (FB) using a first neural network (NN1), determining a boundary area (GB1), which represents a transition from the first cell substrate area (D) towards the second cell substrate area (BL) in the fluorescence image (FB) on the basis of the segmentation information (SEG), wherein the boundary area is a bubble roof between the epidermis and the bubble or a bubble floor between the dermis and the bubble, selecting multiple partial images (TB1, . . . , TBX) from the immunofluorescence image (FB) along the boundary area (GB1), determining a confidence measure (KM) of a presence of the fluorescence pattern on the basis of the multiple partial images (TB1, . . . , TBX) via a second neural network (NN2).

11. Data network device (DV), comprising at least one data interface (DS4) for accepting a fluorescence image (FB), which represents a staining of a cell substrate by a fluorescence stain, wherein the cell substrate is a skin substrate in the form of a salt-split skin comprising an epidermis, a dermis and a bubble between the epidermis and the dermis, and furthermore comprising at least one computing unit (R), which is designed to execute the following steps in the course of digital image processing determining segmentation information (SEG) comprising at least one first and one second segmentation area (SEG1, SEG2), wherein the segmentation areas each represent a respective cell substrate area, via segmentation of the immunofluorescence image (FB) using a first neural network (NN1), determining a boundary area (GB1), which represents a transition from the first cell substrate area (D) towards the second cell substrate area (BL) in the fluorescence image (FB), on the basis of the segmentation information (SEG), wherein the boundary area is a bubble roof between the epidermis and the bubble or a bubble floor between the dermis and the bubble, selecting multiple partial images (TB1, . . . , TBX) from the immunofluorescence image (FB) along the boundary area (GB1), determining a confidence measure (KM) of a presence of the fluorescence pattern on the basis of the multiple partial images (TB1, . . . , TBX) via a second neural network (NN2).

* * * * *